Patented Sept. 21, 1937

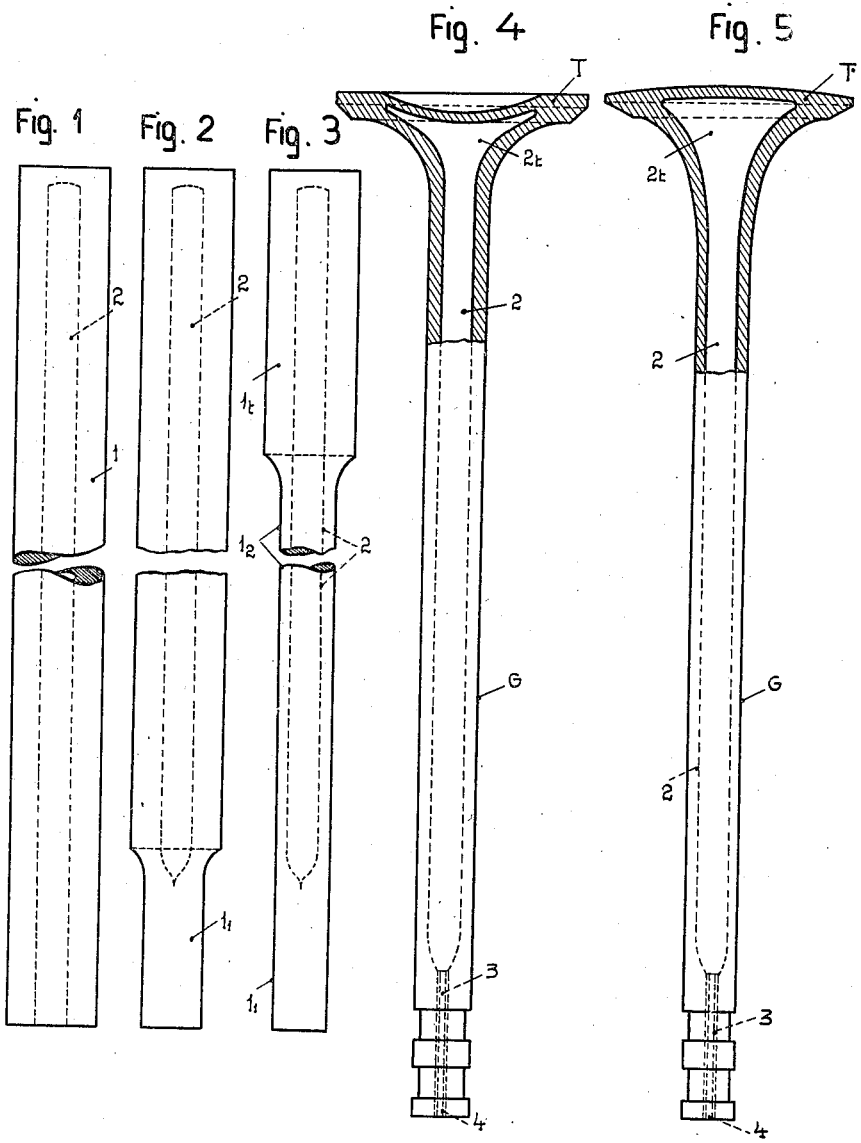

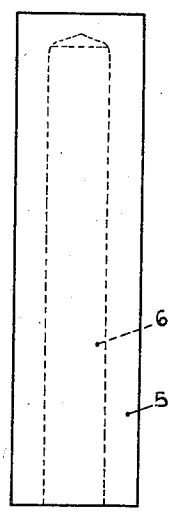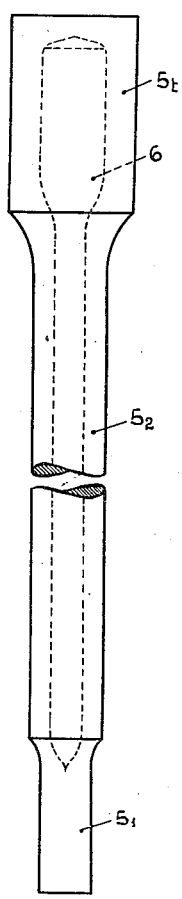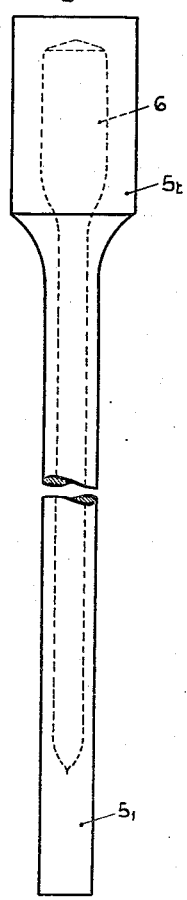

2,093,768

UNITED STATES PATENT OFFICE 2,093,768

METHOD OF MAKING HOLLOW VALVES

Albino Zanzi, Ivrea, Italy, assignor to Thompson Products Incorporated, Cleveland, Ohio, a corporation of Ohio Application December 24, 1931, Serial No. 583,090
In Italy December 30, 1930

17 Claims. (Cl. 29—156.7)

In explosion and internal combustion engines for aircraft, valves of great strength and reduced weight are required which, especially in the case of exhaust valves, must be sufficiently cooled during the normal working of the engine.

A one-piece valve, hollow both in its stem and head, meets the above requirements.

A hollow valve, made in one piece, will have great strength and minimized weight, so that its life and resistance are not impaired even under the hardest working conditions. The hollow construction of the valve improves cooling, not only because the cooling of its head by conduction and radiation is more efficient because of its shape, but also because its recess can be partly filled with a suitable metal or salt, capable of melting or boiling at the temperatures reached by the head during the normal working of the engine. The first mentioned cooling action may therefore be increased by the transmission of heat from the head towards the stem of the valve by the molten metal or salt.

In valves of this invention large differences in temperatures between the valve head and stem are prevented. This temperature gradient cannot be avoided in the usual solid valves.

It is therefore an object of this invention to provide a process for making hollow one-piece valves from a tubular rod or piece of stock that is closed at one end.

Another object of this invention is to form one-piece hollow valves from solid cylindrical rods, including the step of axially boring the rods.

Other and further objects of this invention will become apparent to those skilled in the art from the following detailed description of the annexed sheets of drawings which disclose preferred embodiments of the invention.

On the drawings:

Figure 1 is a broken side elevational view of a cylindrical rod having a blind bore therein, which rod is adapted for use in making the hollow valves of this invention.

Figure 2 is a broken side elevational view of the rod shown in Fig. 1 having the open end thereof closed and reduced in diameter.

Figure 3 is a broken side elevational view of the rod shown in Fig. 2 after a further reduction of the diameter of a portion thereof to form the valve stem.

Figures 4 and 5 are side elevational views, with parts thereof shown in vertical cross section, of two types of valves obtained by means of different shaped dies from blanks such as are shown in Fig. 3.

Figure 6 is a side elevational diagrammatic view of a metal valve blank having a blind bore therein for use in preparing valves with long stems from very hard material.

Figure 7 is a broken side elevational view of an intermediate form of valve prepared from the blank shown in Fig. 6.

Figure 8 is a broken side elevational view of an intermediate form of the valve prepared from the form shown in Fig. 7.

As shown on the drawings:

In Fig. 1 the reference numeral 1 designates a cylindrical metal rod of a length sufficient to form the completed valve. A blind axial bore 2 is formed in the blank 1 with a predetermined diameter smaller than the external diameter of the finished valve stem. The bore 2 extends from one end of the blank into close proximity to the other end as shown in Fig. 1.

According to the process of this invention, a filling material is introduced into the blind bore 2 of the blank 1 and compressed therein up to a short distance from the open end of the bore.

The filling material is preferably of a plastic and flowing character which will not attack or injure the metal of the blank under the action of high temperatures and pressures produced during a hot forging of the metal to prepare the valve. This plastic material as will be hereinafter described, is removed from the finished valve.

A suitable filling material which is very convenient and economical is calcium carbide. It should be understood, however, that the process can be carried out with any other material suitable for the purpose without departing from the spirit of this invention.

After the filling material has been inserted and compressed into the blind bore 2 up to a short distance from the mouth of the bore, the bore is closed by reducing the open end of the blank 1 on the length $l_1$ (Fig. 2).

The closing operation is conveniently carried out by heating the blank to forging temperatures.

The closed blank as shown in Fig. 2 is then machined on the length $l_2$ to the same diameter as the section $l_1$, that is to the diameter of the valve stem as shown in Fig. 3.

The machining operation is conveniently carried out on a lathe, whereupon the unmachined portion of the blank $l_t$ is heated to forging temperatures and the blank is upset to form a head thereon.

In the modification shown in Fig. 4, the upsetting operation is effected with shaping dies to produce a valve head T having a concave or depressed central portion. In the modification shown in Fig. 5, a valve head T is formed with different shaped dies to have a convex or bulging central portion. Obviously the form of valve head shown in Fig. 5 could be depressed to the shape shown in Fig. 4.

In the upsetting operation the filling material forms an enlarged recess $2_t$ in the valve head T as shown in Figs. 4 and 5. This recess $2_t$ is an extension of the recess 2 in the valve stem G. The thickness of the valve walls increases gradually towards the head T as shown in Fig. 5.

After the upsetting operation, an axial bore 3 is formed in the stem end of the valve for removing the filling material contained in the recesses 2 and $2_t$. When the filling material is removed from the valve, the bore 3 in the end thereof can be conveniently closed by a plug 4. The bore 3 may be internally threaded for receiving the plug 4 in screw thread relation.

If calcium carbide is used as the filling material, it is preferably in a powdered or granular form and can readily be removed from the recesses in the valve by merely immersing the valve into water.

When the valve is made of very hard material and the boring of long cylindrical rods is difficult and expensive because of their small diameter as compared with their length, the process illustrated in Figs. 6, 7 and 8 can be used.

According to the modification shown in Figs. 6, 7 and 8, the valves, as illustrated in Figs. 4 and 5, can be obtained from a rod 5 having a larger diameter than the diameter of the rod 1. An axial bore 6 of a larger diameter than the bore 2 of the rod 1 is formed in the rod 5. The bore 6 is then filled with calcium carbide or other suitable filler and the blank is forged to the form shown in Fig. 7. This form comprises an end portion $5_t$ having the initial diameter of the rod 5, a stem $5_2$ and an end $5_1$ closing the bore 6. The blank is then machined to the shape shown in Fig. 8. The blank shown in Fig. 8 is then upset to form the valve head and finished as described above in connection with Figs. 1 to 5.

I claim:

1. The process of manufacturing hollow valves which comprises forming a hole in a piece of stock of a predetermined length from one end thereof into proximity to its other end, introducing into said hole a filling material, closing the mouth of said hole, upsetting the solid closed end of the thus formed blank to form an enlarged head and to spread out the filling material in the head and providing an opening in the closed mouth of the hole for removing the filling material.

2. The process of manufacturing hollow valves which comprises axially boring a metal rod of a predetermined length from one end into proximity to its other end, introducing a filling material into said bore, closing the mouth of said bore by hot reduction of the rod end, reducing a portion of the length of said rod to the desired diameter, forging the solid closed end of said rod for forming the valve head with the filling material spread out into the head and opening the closed mouth for removing the filling material from the valve.

3. The process of manufacturing hollow valves which comprises axially boring a bar of metal of a predetermined length from one end thereof into proximity to its other end, introducing a filling material into the bore, closing the mouth of the bore by hot reduction of the open end of the blank, reducing the diameter of part of the blank to a desired diameter for the stem portion of the valve, forging the solid closed end of the blank for forming the valve head with the filling material spread out into the head and boring the reduced end of the blank for removing the filling material from the valve.

4. The process of manufacturing hollow valves which comprises providing a metal blank having an axial hole extending from one end thereof into proximity to its other end, introducing a filling material into said hole, closing the mouth of the hole by hot reduction of the open end of the blank, simultaneously reducing the diameter and increasing the length of a portion of the blank to form a valve stem, upsetting the non-reduced end of the blank for forming the valve head with the filling material spread out into the head and boring the reduced end of the shaped valve for removing the filling material therefrom.

5. The process for manufacturing hollow valves which comprises providing a hollow rod having an axial bore extending from one end into proximity to its other end, introducing a filling material into said bore, closing the mouth of the bore by hot reduction of the open end of said blank, forging said blank along a portion of the length thereof to reduce the diameter of said portion and at the same time increase the length of said portion for forming a valve stem therefrom, upsetting the unreduced end of the blank for forming a valve head with the filling material spread out into the head and removing the filling material from the shaped valve.

6. The process of manufacturing hollow valves which comprises axially boring a metal bar of a predetermined length from one end into proximity to its other end, introducing calcium carbide into the thus formed hole in the bar, closing the mouth of said hole by hot reduction of the bar end, forging the solid closed end of the bar for forming the valve head with the calcium carbide spread out into the head, boring the reduced end and contacting water through said bore with the calcium carbide in the valve for removal of the calcium carbide therefrom and closing said bore by means of a plug.

7. The process for manufacturing hollow valves which comprises providing a metal blank having a blind bore extending axially therein, filling said bore with calcium carbide, closing the mouth of the bore, reducing a portion of the length of the blank to a desired diameter for the valve stem, upsetting the solid closed end of the blank for forming the valve head with the calcium carbide spread out into the head, opening the reduced end of the blank and contacting the calcium carbide therein with water to effect the removal of the calcium carbide from the shaped valve.

8. The process for manufacturing hollow valves which comprises axially boring a bar of a predetermined length from one end into proximity to its other end, introducing calcium carbide into the hole formed in the bar, closing the mouth of the bore, machining a portion of the length of the bar to a desired diameter for the stem portion of the valve, upsetting the solid closed end of the bar for forming the valve head with the calcium carbide spread out into the head, boring the closed end of the bar and contacting the calcium carbide in the thus shaped valve with water through said bore to remove the calcium carbide from the valve.

9. The process for manufacturing hollow valves which comprises providing a metal blank having an axial blind bore therein, introducing calcium carbide into the bore, closing the mouth of the bore by hot reduction of the open end of the blank, forging a portion of the length of the blank to reduce its diameter and increase its length, upsetting the unreduced end of the blank to form a valve head with the calcium carbide spread out into the head, boring a hole in the reduced end of the blank and conveying water into contact with the calcium carbide through said bore to remove the calcium carbide therefrom.

10. The process of manufacturing hollow valves which comprises providing a metal blank having an axial hole extending from one end thereof into proximity to the other end, introducing calcium carbide into said hole, closing the mouth of the hole by hot reduction of the open end of the blank, reducing the diameter of and at the same time increasing the length of a portion of said blank to the desired extent by forging and successive machining, upsetting the unreduced end of the blank for forming the valve head with the calcium carbide spread out into the head, boring the reduced end of the blank, conveying water into contact with the calcium carbide through said bore to remove the calcium carbide and closing said bore by means of a screw plug.

11. The method of making a hollow valve which comprises forming a hole in a rod, said hole extending from one end of said rod into close proximity with the other end to leave the latter end closed, inserting a filling material into said hole substantially to fill the same, the filling material extending completely to the closed end, upsetting the closed end to form an enlarged head and to spread out the filling material in the head and removing the said material to leave an enlarged recess in the upset head.

12. The method of making a valve which comprises forming a recess in a metal blank, placing an insert of material different from the blank metal into the recess, closing the open mouth of the recess to seal the insert therein and shaping the blank to form a valve head and stem with the insert spread into the head and extending down the stem.

13. The method of making a valve which comprises working a metal blank having an insert of different material than the metal of the blank enclosed therein to form a head and stem on the blank with the insert spread out in the head thereof and extending into the stem.

14. The method of making a valve which comprises providing a cylindrical metal blank with a recess bored axially therein, filling the recess with material different from the metal forming the blank, shaping one end of the blank to the shape of a valve head to spread out the material in the recess and drawing out the remainder of the blank to form a seamless stem integral with the head with said material also extending down in the stem.

15. The method of making a hollow valve which comprises introducing a filler material into a recess of a recessed metal blank, upsetting one end of the blank and drawing out the opposite end of the blank to form the blank into a valve having a head and stem, said upsetting operation causing the insert material to spread out into the head and removing the insert material from the valve to leave a valve having a continuous cavity in the head and stem thereof.

16. The method of making a hollow valve which comprises providing a piece of rod stock with a recess extending substantially longitudinally therethrough, placing an insert material in the recess, upsetting the closed end of the rod to thereby form a head thereon and increase the diameter of the insert material at this portion and removing the insert material from the upset rod to provide a valve having a continuous cavity in the head and stem portions thereof.

17. The method of making a hollow valve which comprises providing a metal blank having a recess containing a filler of material different than the metal of the blank, working the blank to the shape of a valve having a head portion and a stem portion with the filler in the head and stem portions, removing the filler to provide a continuous cavity in the valve enlarged in the head portion and extending axially down the stem.

ALBINO ZANZI.